US006101993A

United States Patent [19]

[11] Patent Number: 6,101,993

[45] Date of Patent: Aug. 15, 2000

Lewis et al.

[54] VARIABLE CAM TIMING CONTROL SYSTEM AND METHOD

[75] Inventors: Donald J. Lewis, Brighton; John David Russell, Farmington Hills, both of Mich.

[73] Assignee: Ford Global Technologies, Inc., Dearborn, Mich.

[21] Appl. No.: 09/253,500

[22] Filed: Feb. 19, 1999

[51] Int. Cl.[7] .............................. F01L 1/34; G01M 15/00

[52] U.S. Cl. ......................... 123/90.17; 73/116; 73/117.3

[58] Field of Search ............................. 123/90.15, 90.17, 123/90.18; 73/116, 117.1, 117.2, 117.3

[56] References Cited

U.S. PATENT DOCUMENTS

| | | | |
|---|---|---|---|
| 4,909,194 | 3/1990 | Bauer | 123/90.15 |
| 5,184,578 | 2/1993 | Quinn, Jr. et al. | 123/90.17 |
| 5,209,202 | 5/1993 | Maurer et al. | 123/414 |
| 5,245,968 | 9/1993 | Kolias et al. | 123/414 |
| 5,289,805 | 3/1994 | Quinn, Jr. et al. | 123/90.17 |
| 5,363,817 | 11/1994 | Ikeda et al. | 123/90.15 |
| 5,428,991 | 7/1995 | Klenk et al. | 73/116 |
| 5,548,995 | 8/1996 | Clinton et al. | 73/116 |
| 5,680,834 | 10/1997 | Szpak et al. | 123/90.15 |

*Primary Examiner*—Weilun Lo

*Attorney, Agent, or Firm*—Allan J. Kippa

[57] ABSTRACT

A system and method for measuring and controlling cam timing of an internal combustion engine uses a filtering method based on a number of equally spaced teeth mounted on the camshaft. The filtering method specifically removes certain oscillations caused by camshaft torsional effects. The filtering method also specifically removes oscillations due to production variations. These oscillations are removed with minimal effect on closed loop system response.

21 Claims, 3 Drawing Sheets

VARIABLE CAM TIMING CONTROL SYSTEM AND METHOD

FIELD OF THE INVENTION

The present invention relates to a measurement system and method for use in feedback control of variable cam timing internal combustion engines.

BACKGROUND OF THE INVENTION

Conventional engines maintain a fixed relationship between camshaft rotation and crankshaft rotation, thereby preserving the relationship between intake and exhaust valve events and piston motion. Alternatively, so called variable cam timing engines utilize a mechanism for adjusting this relationship for various advantages related to increased fuel economy and reduced regulated emissions.

To realize these benefits, accurate control of the cam timing is essential. One known method of controlling variable cam timing is now described. First, the actual cam timing is measured using a toothed wheel on the camshaft and a toothed wheel on the crankshaft. The time, or angle, between receiving pulses from the wheel on the crankshaft and the wheel on the camshaft represents the actual cam timing. Second, a desired cam timing is determined as a function of engine operating conditions. Third, an error signal is created from the difference of the desired cam timing and the actual cam timing. Fourth, control signals based on the error signal are sent to actuators capable of adjusting the cam timing. Such a system is disclosed in U.S. 5,363,817.

The inventors herein have recognized several disadvantages with the above system. First, the actual cam timing signal is susceptible to oscillations in the camshaft rotation. This results in unwanted high frequency measurement oscillations that cause the control system to respond in a less than optimal manner. Conventional filtering methods, such as low pass filters, can be applied to reduce these oscillations. However, these filters reduce the system response by adding a delay, causing slower performance. The size of the delay is proportional to the amount of filtering that is required. On actual operating engines, the necessary filtering to eliminate these oscillations causes an unacceptable reduction in system response.

A second disadvantage is that the actual cam timing signal contains further oscillations unless the manufacturing tolerance on the camshaft teeth location is maintained extremely tight. Requiring tight manufacturing tolerance increases system cost, which is unacceptable.

SUMMARY OF THE INVENTION

An object of the invention claimed herein is to provide a method for controlling variable cam timing systems with acceptable response performance and accuracy while reducing the necessary manufacturing tolerances on mechanical parts.

The above object is achieved and disadvantages of prior approaches overcome by a method for measuring camshaft position of a variable position camshaft coupled to a crankshaft of an internal combustion engine. The method comprises generating a first signal indicating crankshaft position, generating a second signal indicating camshaft position at a predetermined number of angular positions per revolution of the camshaft, calculating a current camshaft position relative to the crankshaft based on said first signal and said second signal, and computing a filtered camshaft position by filtering said current camshaft position with an averaging filter, with a number of averages based on said predetermined number of occurrences.

By using a filter that executes synchronously with the receiving of cam timing information wherein the filter order is based on the number of teeth, oscillations related to manufacturing tolerances can be removed. Further, certain oscillations with a cyclic frequency related to engine rotation can be removed. In addition, the method not only minimizes the impact of these certain oscillations, but also minimally impacts the system response, thus overcoming the disadvantages of prior approaches.

An advantage of the above aspect of the invention is improved cam timing control system performance.

Another, more specific, advantage of the present inventions is improved emission control.

Another advantage of the above aspect of the invention is improved fuel economy.

Yet another advantage of the above aspect of the invention is reduced system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DETAILED DESCRIPTION OF THE PREFERRED EMBODIMENT(S)

Figure 1:
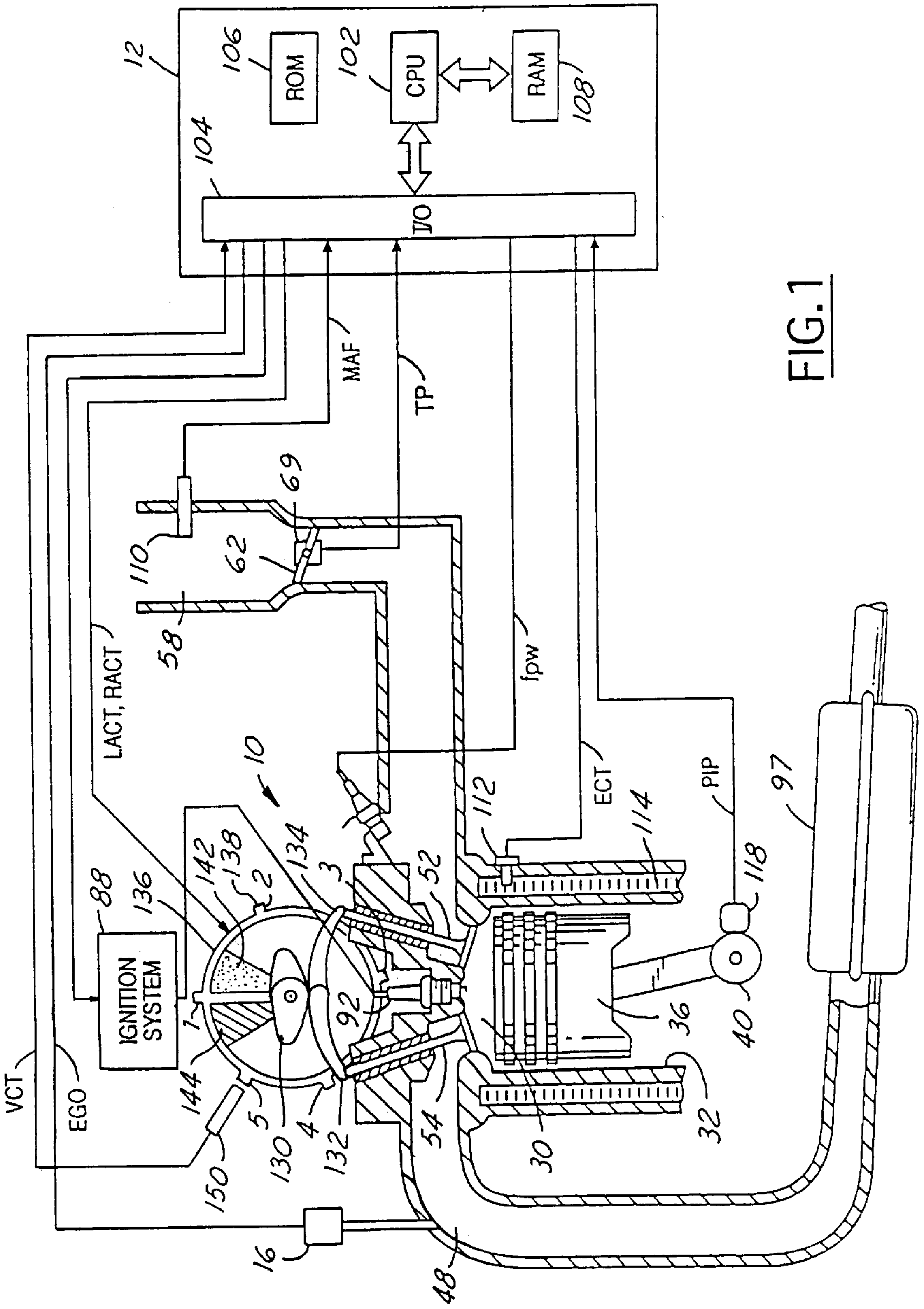
FIG. 1 is a block diagram of an engine including the present invention.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via intake valve 52 and exhaust valve 54, respectively. Intake manifold 44 is shown communicating with throttle body 58 via throttle plate 62. Throttle position sensor 69 measures position of throttle plate 62. Exhaust manifold 48 is shown. Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Conventional distributorless ignition system 88 provides ignition spark to combustion chamber 30 via spark plug 92 in response to controller 12. Two-state exhaust gas oxygen sensor 16 is shown coupled to exhaust manifold 48 upstream of catalytic converter 97. Sensor 16 provides signal EGO to controller 12 which converts signal EGO into two-state signal EGOS. A high voltage state of signal EGOS indicates exhaust gases are rich of a reference air/fuel ratio and a low voltage state of converted signal EGO indicates exhaust gases are lean of the reference air/fuel ratio.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of mass air flow measurement (MAF) from mass flow sensor 116 coupled to intake manifold 44; and a profile ignition pickup signal (PIP) from Hall effect sensor 118 coupled to crankshaft 40. In a preferred aspect of the present invention, engine speed sensor 119 produces a predetermined number of equally spaced pulses every revolution of the crankshaft.

Camshaft 130 of engine 10 is shown communicating with rocker arms 132 and 134 for actuating intake valve 52 and exhaust valve 54. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valve 52 and exhaust valve 54 open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valve 52 and exhaust valve 54 open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another), while tooth 5 is preferably used for cylinder identification, as described later herein. In addition, Controller 12 sends control signals (LACT,RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five toothed wheel, a measure of cam timing for a particular bank is received four times per revolution, with the extra signal used for cylinder identification.

Figure 2:
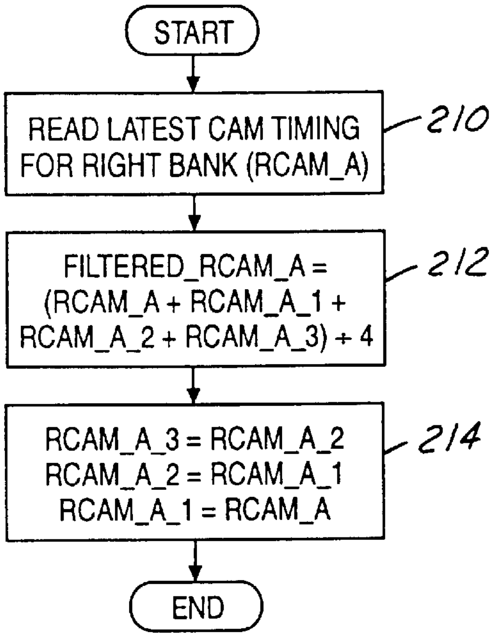
FIGS. 2–5 are high level flowcharts of various operations performed by a portion of the embodiment shown in FIG. 1; and, FIG. 6 is a graph of cam timing measurements in which results of the invention are illustrated.

Referring now to FIG. 2, a flowchart of a routine performed by controller 12 to generate filtered cam timing of the right cylinder bank is described for the particular application of a V-8 with two cylinder banks. Each bank is equipped with five teeth, four evenly spaced for measuring cam position and one for cylinder identification positioned between two of the four evenly spaced teeth. The routine is executed upon receiving a signal from any one of the four evenly spaced teeth of the right bank. In step 210, the latest cam timing, RCAM_A, for the right bank is read. Then, in step 212, the filtered cam timing for the right bank, FILTERED_RCAM_A, is calculated as the average of the current cam timing and the last three cam timing measurements. These four measurements are selected based on the number of equally spaced teeth used for measuring cam timing. If, for example, a V-engine with six cylinders uses three equally spaced teeth, then the average of the last three measurements is used.

Because the number of averages corresponds to the number of equally spaced teeth in a revolution, cyclic variation due to manufacturing imperfections in teeth location is removed. Also, this method will remove oscillations that occur from camshaft movements due to valve torsional effects as described later herein with particular reference to FIG. 6. Valve torsional effects are kinematic torques applied to camshaft 130 from valves 52 and 54. In general terms, when opening a valve there is a positive torque on camshaft 130 and when closing a valve there is a negative torque on camshaft 130.

Figure 3:
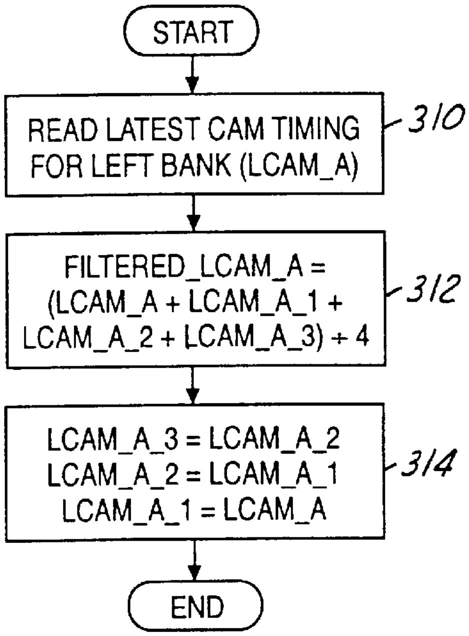

Referring now to FIG. 3, a flowchart of a routine performed by controller 12 to generate filtered cam timing of the left cylinder bank is described for the particular application of a V-8 with two engine banks. The routine is executed upon receiving a signal from any one of the four evenly spaced teeth of the left bank. In step 310, the latest cam timing, LCAM_A, for the left bank is read. Then, in step 312, the filtered cam timing for the left bank, FILTERED_LCAM_A, is calculated as the average of the current cam timing and the last three cam timing measurements. These four measurements are selected based on the number of equally spaced teeth used for measuring cam timing. If, for example, a V-engine with six cylinders uses three equally spaced teeth, then the average of the last three measurements is used.

In an alternative embodiment of the present invention where it is unnecessary to remove oscillations due to manufacturing tolerances, but it is necessary to remove oscillations due to valve torsional effects, an alternative filter is used based on the number of evenly spaced teeth and the frequency of valve torsional effects. In this particular example, valve torsional effects occur at a rate of 3 cycles per camshaft revolution. For the case of a V-8 engine with two banks and 4 equally spaced teeth, the valve torsional effects are aliased an cause a measurement oscillations at the frequency of 1 cycle per camshaft revolution. As is obvious to one of ordinary skill in the art in view of this disclosure, this type of aliasing and frequency analysis can be performed for any combination of number of teeth and valve torsional frequency to obtain an averaging filter that will remove the unwanted oscillations.

The general equations for determining an observed frequency ($f_o$) given the sampling frequency ($f_s$) and the true frequency ($f_t$) of the signal is found using the equation below. Sampling frequency ($f_s$) is determined based on the number of equally spaced teeth of camshaft 130.

$$\frac{f_0}{f_s} = \left[\frac{f_t}{f_s} - g\left(\frac{f_t}{f_s} + \frac{1}{2}\right)\right]\cos\left[\pi g\left(\frac{2f_t}{f_s}\right)\right]$$

where, g( )rounds the value of the input to the nearest integer towards minus infinity. Then, once the observed frequency ($f_o$) is known, the appropriate filter can be designed using the equation below.

$$H(z) = \left(1 - e^{\frac{2\pi f_0}{f_s}i} z^{-1}\right)\left(1 - e^{\frac{-2\pi f_0}{f_s}i} z^{-1}\right)$$

where, H(z) is a discrete filter, z is a discrete operator, and i is the square root of minus one.

Figure 4:
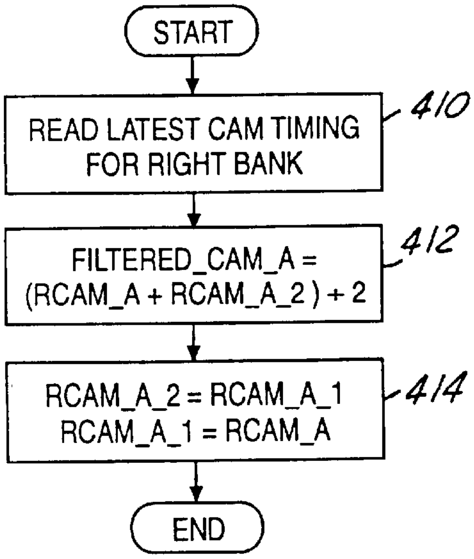

For the specific example previously described herein using a V-8 engine, the method described later herein with reference to FIG. 4 is applicable. For this example, the true frequency is three quarters of the sampling frequency and the observed frequency is one quarter the sampling frequency. Thus, the filter becomes:

$$1+z^{-2}$$

A scaling factor of ½ is used to obtain unity gain.

Referring to FIG. 4, in step 410, the latest cam timing, RCAM_A, for the right bank is read. Then, in step 412, the filtered cam timing for the right bank, FILTERED_RCAM_A, is calculated as the average of the current cam timing and the cam timing measurement two events in the past. This corresponds to using a filter of the form:

$$\frac{1+z^{-2}}{2}$$

By averaging the present measurement of cam timing and the measurement two events in the past, it is possible to cancel oscillations in the measurement that occur once per revolution. This exactly corresponds to cam torsional effects for a V-8 engine wherein the cam torsional effects occur with a frequency of 3 cycles per camshaft revolution. The valve torsional frequency can be computed by those skilled in the art based on the firing order. The firing order refers to the order in which cylinders on the respective banks are fired. For the example V-8 engine described herein, the firing order is LEFT-RIGHT-LEFT-LEFT-RIGHT-LEFT-RIGHT-RIGHT.

Figure 5:
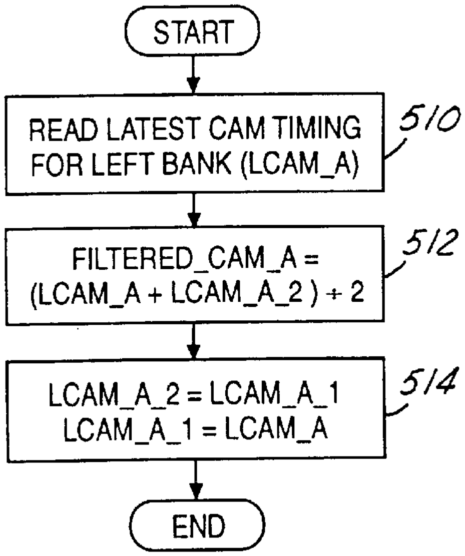

Referring to FIG. 5, in step 510, the latest cam timing, LCAM_A, for the left bank is read. Then, in step 512, the filtered cam timing for the left bank, FILTERED_LCAM_A, is calculated as the average of the current cam timing and the cam timing measurement two events in the past. This corresponds to using a filter of the form:

$$\frac{1+z^{-2}}{2}$$

For similar reasons as stated above with reference to FIG. 4, the filter removes the unwanted oscillations with minimal impact on response time.

Figure 6:
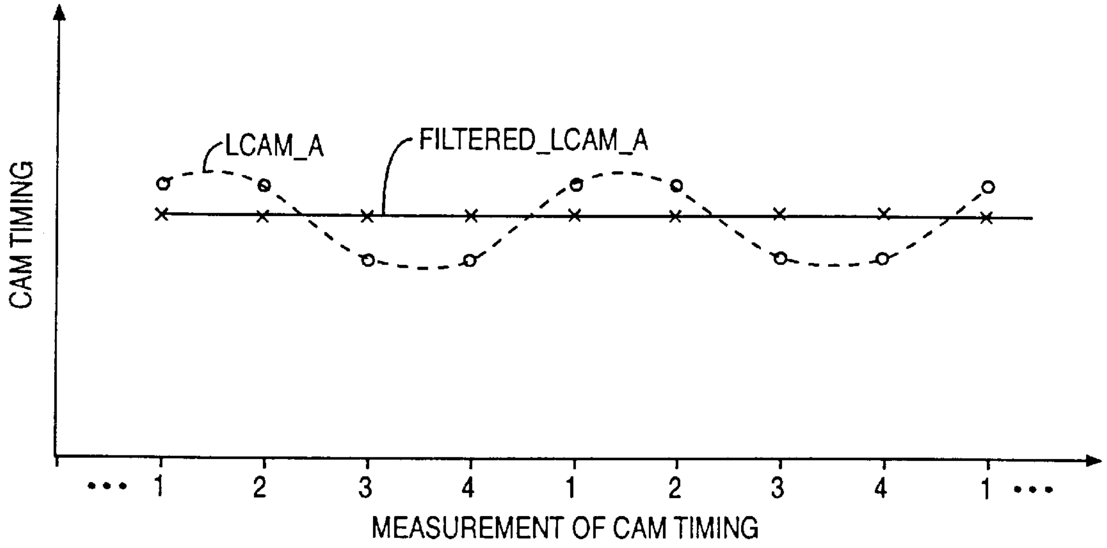

Referring now to FIG. 6, a plot of an example of the present invention is shown. The plot shows the unfiltered signal LCAM_A, indicated by the dashed line and open circles, measured by teeth 1–4. The unfiltered signal has an oscillation related to cam torsional effects. The filtered signal (FILTERED_LCAM_A), computed according to block 512 of FIG. 5 is shown by the dash dot line and crosses. By using the method described previously herein with particular reference to FIG. 5, the unwanted oscillations are removed, providing a more advantageous signal for closed loop control of cam timing.

Figure 7:
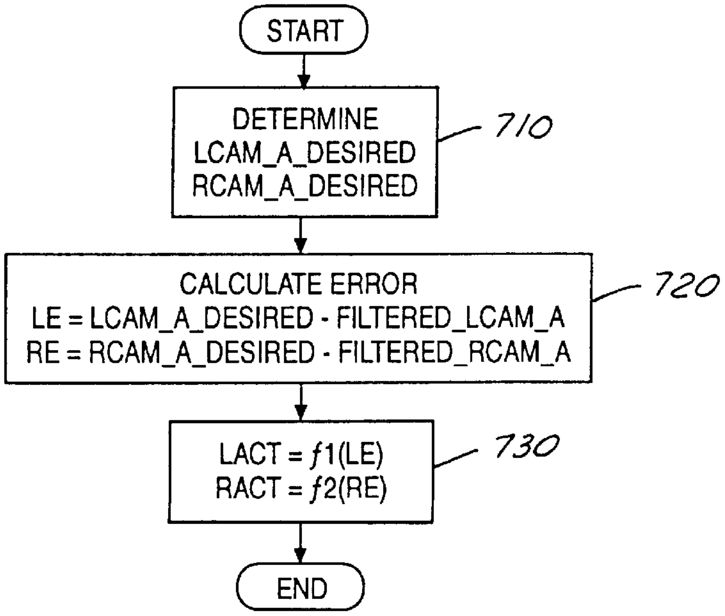
FIG. 7 is a flowchart showing a routine for performing closed loop control of cam timing according to the present invention.

Referring now to FIG. 7, a routine for performing closed loop control of cam timing is described. In step 710, desired cam timing for left and right banks (LCAM_A_DESIRED, RCAM_A_DESIRED) are determined based on engine operating conditions. For example, desired cam timing is determined based on engine speed, engine airflow, and throttle position (TP). Then, in step 720, the left bank error, LE, and the right bank error, RE, are calculated based on the desired cam timing and the filtered cam timing for each bank. Then, in step 730, actuation signals, LACT and RACT, are calculated based on errors RE and LE using functions f1 and f2. In a preferred embodiment, functions f1 and f2 represent proportional, integral, and derivative controllers. However, any controller, either feedforward or feedback, known to those skilled in the art can be used.

As is obvious to one of ordinary skill in the art in view of this disclosure, an alternative to the above embodiments would be to purposely select the number of teeth on the camshafts based on the described frequency and aliasing analysis so that the valve torsional frequency would alias to a frequency of zero, thus requiring no filter.

While the best mode for carrying out the invention has been described in detail, those skilled in the art in which this invention relates will recognize various alternative designs and embodiments, including those mentioned above, in practicing the invention that has been defined by the following claims.

What is claimed is:

1. A method for measuring camshaft position of a variable position camshaft coupled to a crankshaft of an internal combustion engine, the method comprising:

generating a first signal indicating crankshaft position;

generating a second signal indicating camshaft position at a predetermined number of angular positions per revolution of the camshaft;

calculating a current camshaft position relative to the crankshaft based on said first signal and said second signal; and computing a filtered camshaft position by filtering said current camshaft position with an averaging filter, with a number of averages based on said predetermined number of occurrences.

2. The method recited in claim 1 wherein said calculating step is performed when said second signal is generated.

3. The method recited in claim 1 wherein said computing step is performed when said second signal is generated.

4. The method recited in claim 1 wherein said second signal is generated from a toothed wheel coupled to the camshaft.

5. The method recited in claim 4 wherein said predetermined number of angular positions is equal to a number of teeth on said toothed wheel.

6. The method recited in claim 1 wherein said number of averages is equal to said predetermined number of occurrences.

7. The method recited in claim 1 wherein said number of averages is based on said predetermined number of angular positions and a valve torsional frequency.

8. The method recited in claim 7 further comprising the step of storing said current camshaft position upon each execution of the method.

9. The method recited in claim 8 wherein said computing step further comprises the step of computing said filtered camshaft position by averaging said current camshaft position and said stored camshaft position from two previous executions when said predetermined number of angular positions is four.

10. The method recited in claim 9 wherein said computing step further comprises the step of computing said filtered camshaft position by averaging said current camshaft position and said stored camshaft position from two previous executions when said valve torsional frequency is three cycles per camshaft revolution.

11. The method recited in claim 5 wherein said teeth are equally spaced.

12. The method recited in claim 4 wherein said steps of calculating and computing are suspended when said second signal is generated from a non-equally spaced tooth on said toothed wheel.

13. A method for measuring camshaft position of a variable position camshaft coupled to a crankshaft of an internal combustion engine, the method comprising:

generating a first signal indicating crankshaft position;

generating a second signal indicating camshaft position from a toothed wheel coupled to the camshaft;

when said second signal is generated, calculating a current camshaft position relative to the crankshaft based on said first signal and said second signal; and when said second signal is generated, computing a filtered camshaft position by filtering said current camshaft position with an averaging filter, with a number of averages based on a number of teeth on said toothed wheel.

14. The method recited in claim 13 wherein said number of averages is equal to said number of teeth.

15. The method recited in claim 13 wherein said number of averages is based on said number of teeth on said toothed wheel and a valve torsional frequency.

16. The method recited in claim 13 wherein said teeth are equally spaced.

17. The method recited in claim 13 wherein said steps of calculating and computing are suspended when said second signal is generated from a non-equally spaced tooth on said toothed wheel.

18. A system for controlling camshaft position of a variable position camshaft coupled to a crankshaft of an internal combustion engine, the system comprising:

a crankshaft sensor for measuring crankshaft position;

a camshaft sensor for measuring camshaft position at a predetermined number of angular positions per camshaft revolution;

an actuator for affecting a relative camshaft position to said crankshaft; and a controller for receiving a first signal from said crankshaft sensor, receiving a second signal from said camshaft sensor, calculating a current camshaft position relative to said crankshaft based on said first signal and said second signal, computing a filtered camshaft position by filtering said current camshaft position with an averaging filter, with a number of averages based on said predetermined number of occurrences, creating a desired camshaft position based on engine operating conditions, and sending a control signal to said actuator based on said desired camshaft position and said filtered camshaft position.

19. The system recited in claim 18 wherein said controller further calculates said current camshaft position relative to said crankshaft based on said first signal and said second signal when said second signal is received.

20. The system recited in claim 19 wherein said controller further computes said filtered camshaft position by filtering said current camshaft position with said averaging filter when said second signal is received.

21. The system recited in claim 18 wherein said number of angular positions are based on a number of teeth on a toothed wheel coupled to the camshaft.

* * * * *

UNITED STATES PATENT AND TRADEMARK OFFICE

CERTIFICATE OF CORRECTION

PATENT NO : 6,101,993

DATED : 08/15/00

INVENTOR(S) : Donald J. Lewis; John David Russell

It is certified that error appears in the above-identified patent and that said Letters Patent are hereby corrected as shown below:

On first page, line indicating "Attorney, Agent, or Firm", after "Allan J" delete "Kippa" and insert therefor --Lippa--.

Signed and Sealed this

Seventeenth Day of April, 2001

Attest:

Nicholas P. Godici

NICHOLAS P. GODICI

*Attesting Officer*

*Acting Director of the United States Patent and Trademark Office*